United States Patent Office 3,799,779
Patented Mar. 26, 1974

3,799,779
LIGHT-DESENSITIZABLE IMAGING SHEET
Malcolm B. Burleigh, St. Paul, Minn., assignor to Minnesota Mining and Manufacturing Company, St. Paul, Minn.
No Drawing. Filed Sept. 13, 1971, Ser. No. 180,215
Int. Cl. G03c 1/92
U.S. Cl. 96—82
29 Claims

ABSTRACT OF THE DISCLOSURE

Imaging sheets are provided comprising a light-sensitive layer including (1) film-forming binder, (2) a reactant which is reactive with a co-reactant to provide a visible change and is rendered non-reactive with said co-reactant upon desensitization with excited oxygen, and (3) a polycyclic, aromatic, oxygen-sensitizing dye.

(1) FIELD OF THE INVENTION

This invention relates to light-desensitizable imaging sheets of the type containing a reactant which is capable of being readily desensitized or made non-reactive by excited molecular oxygen in an image-wise manner.

(2) BACKGROUND OF THE INVENTION

In previously known imaging and copying processes, e.g. those of the type described in U.S. Pat. 3,094,417 (Workman), light-desensitizable intermediate film members can be used. Generally such processes involve placing graphic originals in contact with a light-desensitizable intermediate film or sheet containing a volatilizable reactant or acceptor and a sensitizing dye, followed by exposure of the original to light through the intermediate sheet for a time sufficient to desensitize the reactant in the intermediate sheet in the exposed areas. The exposed intermediate sheet is then usually heated in contact with a heat-sensitive receptor sheet containing heavy metal soaps as co-reactants, whereby the volatilizable reactant or acceptor is transferred to the receptor sheet in an image-wise manner to cause imagewise darkening of the receptor sheet.

Although such intermediate sheets have been well received in the copying field, there are a number of drawbacks associated with the use of such intermediate sheets that have not heretofore been alleviated. For example, the light exposure time required with such intermediate sheets is relatively critical insofar as final copy quality is concerned. That is, the length of time for which the intermediate sheet is exposed to light while in contact with the original must be carefully controlled so that under-exposure and over-exposure are avoided. Such intermediate sheets also at times produce what is commonly called "image erosion," i.e. copies made from graphic originals having thin lines sometimes show broken or eroded lines instead of uniform continuous lines. Furthermore, such intermediate sheets suffer in stability under conditions of high temperature and high humidity. Such intermediate sheets also have been known to produce dark backgrounds in copies made after prolonged exposure of the intermediate sheet to the atmosphere. It has also been found that the amount of sensitizer dye included in the intermediate sheet must be carefully controlled in order to produce an intermediate sheet of the proper speed.

The present invention provides a more suitable intermediate imaging sheet which minimizes the foregoing problems commonly associated with previously known intermediate sheets. The imaging sheets of the invention utilize a defined class of polycylic, aromatic, oxygen-sensitizing dye compounds.

SUMMARY OF THE INVENTION

In accordance with the present invention there is provided an imaging sheet including a light-sensitive layer of film-forming binder having dispersed therethrough a reactant (i.e. acceptor) which is reactive with a co-reactant to provide a visible change and is rendered non-reactive with said co-reactant upon desensitization with excited oxygen, and an effective amount, within the range of about 0.05 to 2 weight percent based on the total weight of said layer, of an oxygen-sensitizing polycyclic aromatic dye, said dye comprising at least two moieties in conjugate relationship as part of a single chromophore, each said moiety comprising three linearly kata condensed six-membered aromatic rings, an —OZ group being attached to the meso position of each said moiety, wherein Z is a stable, monovalent radical, said —OZ group being a solubilizing group for said compound, wherein at least one auxochromic group comprising an atom having an atomic weight of at least 31 is bonded to said chromophore by means of said atom; wherein said dye compound exhibits visible fluorescence when a 0.001 molar solution thereof is exposed to ultraviolet light in the 200 to 400 nanometer wavelength range; wherein said reactant is desensitized in an image-wise manner upon exposure of the imaging sheet to a visible light image pattern. When the film-forming binder, reactant and dye are in the form of a thin face-coating on a lgiht-transmissive film material backing the invention provides a light-densensitizable intermediate film useful in copying processes of the type described in U.S. Pat. 3,094,417. The light-desensitizable imaging sheets of the invention require lesser amounts of sensitizing dye than previously used because of the increased effectiveness of these polycyclic dyes as oxygen sensitizers. The imaging sheets are much more stable under conditions of high temperature and high humidity than previously known imaging sheets, and the novel imaging sheets cause much less background darkening of finished copies than do prior imaging sheets after prolonged exposure of the imaging sheets to the atmosphere before being used in the copying process. The imaging sheets of the invention also allow for more variable and less critical exposure times without loss of line copying quality and definition when copying originals than has been possible with imaging sheets provided heretofore.

The invention also provides a unitary heat-sensitive imaging sheet capable of undergoing permanent visible change on being momentarily heated to a conversion temperature between about 90° C. and 150° C. and comprising a thin backing and a visibly heat-sensitive layer comprising a film-forming binder, at least two chemically inter-reactant components in physically distinct and chemically inter-reactive relationship for rapidly inter-reacting at said conversion temperature to produce a visibility distinct reaction product and of which one of said components is capable of being readily desensitized in the presence of excited molecular oxygen, and a polycyclic, aromatic, oxygen-sensitizing dye comprising at least two moieties in conjugate relationship as part of a single chromophore, each said moiety comprising three linearly kata condensed six-membered aromatic rings, an —OZ group being attached to the meso position of each said moiety, wherein Z is a stable, monovalent radical, said —OZ group being a solubilizing group for said compound, wherein at least one auxochromic group comprising an atom having an atomic weight of at least 31 is bonded to said chromophore by means of said atom; wherein said dye compound exhibits visible fluorescence when a 0.001 molar solution thereof is exposed to ultraviolet light in the 200 to 400 nanometer wavelength range.

DETAILED DESCRIPTION OF THE INVENTION

The light-desensitizable imaging sheets of the invention comprise a layer of film-forming binder having dispersed therethrough a reactant or acceptor and certain polycyclic, aromatic, oxygen-sensitizing dyes. The reactant or acceptor can be defined as a photosensitive material which is capable of being readily desensitized by excited molecular oxygen and which will react with a coreactant to produce a distinctly visible image. The polycyclic aromatic dye, upon image-wise exposure of the imaging sheet to light, excites or sensitizes molecular oxygen in the exposed areas of the sheet, whereupon the excited oxygen desensitizes the acceptor in an image-wise pattern. The thus exposed imaging sheet, depending upon the particular type of acceptor present in the sheet, can be heated in contact with a suitable heat-sensitive receptor sheet containing a co-reactant to make a copy of the original or it can be illuminated with black (ultraviolet) light to produce a fluorescent image on the imaging sheet itself if the acceptor exhibits strong visible fluorescence with its major absorption bands preferably being in the ultraviolet region. The co-reactant for the acceptors which exhibit strong visible fluorescence comprises photons of the proper energy necessary to excite the fluorescent acceptor, i.e. photons of ultraviolet light in the wavelength range of 200–400 nanometers.

Although the imaging sheets of this invention do not require the presence of a separate supporting backing, these sheets are typically provided with film material backings (e.g. "Mylar" polyester, glassine paper and the like). When intermediate sheets are desired, the backing is normally a thin, light-transmissive, transparent, flexible film or paper and the film-forming binder, acceptor and sensitizing dye are in the form of a thin face-coating bonded to the flexible film or paper.

The photosensitive reactants or acceptors which can be used in the imaging sheets of this invention can be of many and various types. For example, alpha-naphthols are quite useful, e.g., 4-methoxy-1-naphthol, 1-hydroxy-2-methyl - 4 - methoxy naphthalene, 1-hydroxy-4-ethoxy naphthalene, 4,4'-dimethoxy-1,1'-dihydroxy-2,2'-binaphthyl, 1,1'-dihydroxy-2,2'-binaphthyl, 1,4-dihydroxy naphthalene, 1,3-dihydroxy naphthalene, 1,5-dihydroxynaphthalene, the condensation product of 1,5-dihydroxynaphthalene with acetone or with adipoyl chloride. Generally, these alpha-naphthol photosensitive reactants can be described as an alpha-naphthol having attached directly to the hydroxy-substituted aromatic ring a preponderance of electron donor groups which may be alkyl, aryl, alkoxy, aryloxy, hydroxy or amino.

Another useful class of photosensitive reactants or acceptors are those substituted hydrazones in which the amino group is either unsubstituted or is substituted with electron-donating groups such as aryl or alkyl radicals. Representative reactants in this class include the phenylhydrazones, simple hydrazones, and N,N-dimethylhydrazones.

Another large class of useful photosensitive reactants or acceptors comprises those compounds possessing a diene unsaturation which are capable of reacting in a Diels-Alder reaction with typical dienophiles such as maleic anhydride. Typical examples of these compounds are furan, difurfuryldithiooxamide, and 1,3-diphenylisobenzofuran.

Olefins substituted with sufficient electron-donating groups to make them photosensitive are also useful in the imaging sheets described herein. Typical examples of such olefins include tetramethylethylene, enamines, and tetramethoxyethylene.

Other photosensitive reactants or acceptors include substituted oxazoles and substituted imidazoles, e.g., 2,5-diphenyloxazole, 2-(1-naphthyl)-5-phenyloxazole, and triphenylimidazole. Other useful acceptors known in the art can also be used, e.g. substituted dithiooxamides.

Photosensitive reactants or acceptors which exhibit strong fluorescence under ultraviolet light include 2,5-diphenyloxazole, 2-(1-naphthyl)-5-phenyloxazole, and 1,3-diphenylisobenzofuran. Other such acceptors are known in the art.

The oxygen-sensitizing dyes useful in the practice of this invention can be described as polycyclic aromatic compounds comprising at least two moieties in conjugate relationship as part of a single chromophore, each said moiety comprising three linearly kata condensed six-membered aromatic rings, an —OZ group being attached to the meso position of each said moiety, wherein Z is a stable, monovalent radical; said —OZ group being a solubilizing group for said compound; wherein at least one auxochromic group comprising an atom having an atomic weight of at least 31 is bonded to said chromophore, said atom being attached directly to said chromophore. The above-mentioned moieties comprising three linearly kata condensed six-membered aromatic rings may be described pictorially as follows:

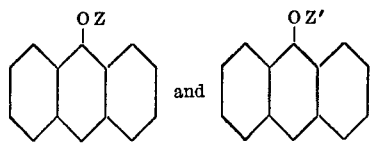

The aromatic rings may be homocyclic (carbon atoms) or heterocyclic, the hetero atoms being generally nitrogen. Of course, a single compound can contain both homocyclic and heterocyclic moieties of the type just described, or the compound may contain only homocyclic or only heterocyclic moieties.

These moieties are in conjugate relationship in the compound. Thus, the moieties may be bonded together in peri fashion such that the two moieties share atoms, or the moieties may be attached to each other in conjugate relationship through at least one linking moiety, where the linking moiety is selected from the group consisting of (a) atoms which are at least trivalent and are capable of forming covalent bonds, (b) ligands, having two or more atoms, which are at least bidentate, and (c) covalent single or double bonds.

Additionally, these dye compounds have at least one auxochromic group bonded to the chromophore thereof, the auxochromic group comprising a heavy atom, i.e. an atom having an atomic weight of at least 31. The preferred auxochromic groups consist only of a single heavy atom.

Although the —OZ and —OZ' groups which are present on the dye compounds are also auxochromic groups, it has been found that the —OZ and —OZ' groups are primarily solubilizing groups for the compound, i.e. they primarily determine the solubility of the dye compound in various solvent media into which the dye may be placed. It has also been found that the Z and Z' radicals have very little effect on the ability of the compound to function as an oxygen sensitizer. Thus, the chemical structure and nature of the Z and Z' radicals are not critical.

Generally, it may be said that Z and Z' are monovalent radicals which are stable under ambient conditions and which do not cause decomposition of the chromophore portion of the dye compound. That is, these radicals do not oxidize or reduce the chromophore portion of the dye compound nor do they destroy or adversely affect the effectiveness of the compound as a dye. Within these limitations the —OZ and —OZ' radicals can be stable derivatives of an inorganic acid, e.g. —OSO$_3^-$Y$^+$ where Y is an alkali metal, alkaline earth metal, or ammonium ion; —OPO$_3$R$_2$ where R is hydrogen or a stable organic radical; and —OPO$_2$R$_2$ where R is hydrogen or a stable organic radical.

Insofar as organic radicals are concerned, Z and Z' may be alkyl, cycloalkyl, substituted alkyl and cycloalkyl, alkenyl, alkynyl, aryl, polycyclic, acyl, alkaryl or aralkyl. Z and Z' may be the same or different. Alkyl radicals having one carbon or more are common Z radicals, and lower alkyl radicals are preferred, although long chain alkyls are also useful. Substituted alkyl radicals are herein defined to include alkyl radicals which are substituted with any moiety or group other than hydrogen atoms and other alkyl radicals.

The moieties comprising the three kata condensed six-membered aromatic rings are in a conjugate relationship in the dye compounds so that these moieties are part of a single chromophore (i.e. part of the same chromophore). A chromophore may be defined as a group of atoms or electrons in a molecule which is chiefly responsible for an absorption band, as defined in Theory and Application of Ultraviolet Spectroscopy; Jaffe and Orchin; John Wiley & Sons, Inc. (1962), incorporated herein by reference. The two moieties may be bonded or condensed together in peri fashion, e.g.

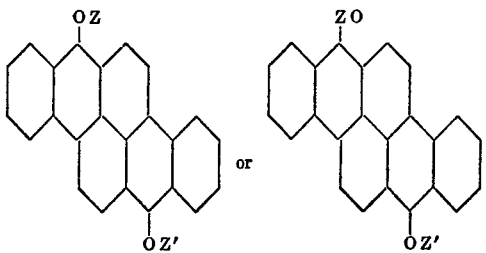

where the two moieties share atoms, or the moieties may be attached to each other in conjugate relationship through at least one linking moiety. The linking moieties are selected from the group consisting of (a) atoms which are at least trivalent and which are capable of forming covalent bonds, e.g. nitrogen, carbon, sulfur and oxygen, (b) ligands, having two or more atoms, which are at least bidentate (e.g. such ligands can be bidentate, tridentate, quadradentate, hexadentate, octadentate, etc., and (c) covalent single or double bonds.

The size, chemical nature or structure of the linking moiety is not critical insofar as the general ability of the dye compound to function as an oxygen sensitizer is concerned, so long as the two moieties comprising the kata condensed aromatic rings are attached to each other in conjugate relationship such that they are part of a single chromophore.

The linking moiety, of course, can be a polycyclic structure (homocyclic or heterocyclic). Hetero atoms in the heterocyclic linking moieties are generally nitrogen, oxygen and sulfur.

In many of the compounds there are two linking moieties. For example, there may be two ligands, one ligand and a covalent bond, two covalent bonds, etc., as linking moieties in a single compound.

The auxochromic groups which are bonded to the chromophore portion of the dye compound may consist of one atom or of many atoms, so long as a heavy atom (i.e. having an atomic weight of at least 31), present as part of the auxochromic group, is bonded directly to the chromophore portion of the dye. An auxochromic group may be defined as a group bonded to a chromophore which influences the nature of the excited states, as defined in Theory and Application of Ultraviolet Spectroscopy; Jaffe and Orchin; John Wiley & Sons, Inc. (1962).

Preferred single atom auxochromic groups include chlorine, bromine, mercury, sulfur, iodine and selenium. Other useful single atom auxochromic groups include phosphorus (treated herein as having an atomic weight of 31), arsenic, tellurium, germanium, tin, lead and antimony. The auxochromic group may consist of more than one atom so long as a heavy atom present as part of the auxochromic group is directly bonded to the chromophore portion of the dye. For example,

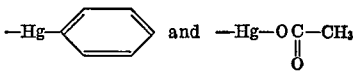

are useful auxochromic groups.

The above-described auxochromic groups may be bonded directly to one or both of the moieties comprising the kata condensed aromatic rings, or the auxochromic groups may be bonded to the linking moiety instead, so long as the auxochromic groups are bonded to the chromophore portion of the compound. So far as is known, the particular positions of attachment of the auxochromic groups to the chromophore do not influence the ability of the dye compound to function as an oxygen sensitizer.

Although not all dye compounds coming within the foregoing description are useful as oxygen-sensitizers in the practice of this invention, a suitable test has been found which accurately and conveniently distinguishes useful polycyclic aromatic dyes of the above description from those dyes which are not suitable for use in this invention. A particular dye to be tested is first dissolved in an inert organic solvent selected from the group consisting of chloroform, acetone and ethanol, or mixtures thereof, at a concentration of 0.001 mole per liter. At ambient temperature, the dye solution (100 milliliters in a 200 milliliter open top beaker) is directly exposed to ultraviolet light in the 200–400 nanometer wavelength range using a 70 watt (Spectroline Black Light, Model No. TF-250) black light at a distance of about 6–8 inches, whereupon visible fluorescence is instantaneously observed for solutions of dyes which are useful in the practice of this invention. When the dye solutions are exposed and observed in the absence of visible light, i.e. in darkness, the fluorescence is very easily observed, and with most dyes tested thus far the fluorescence has been very easily observed even in the presence of visible light.

Preferred classes of dye compounds which have been found especially useful as oxygen sensitizers in accordance with this invention are as follows, where X represents an auxochromic group comprising a heavy atom bonded to the chromophore portion of the compound by means of said atom, and $n$ is one or more.

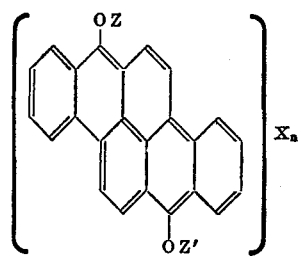

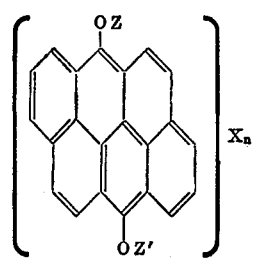

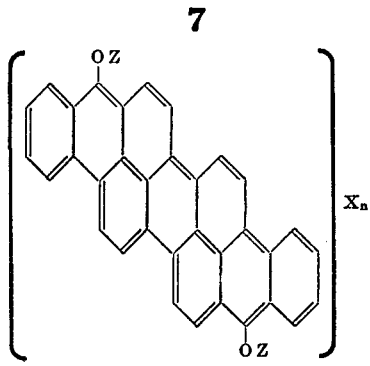

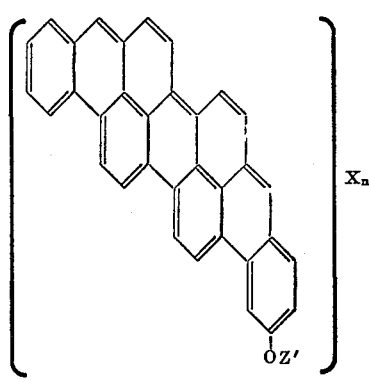

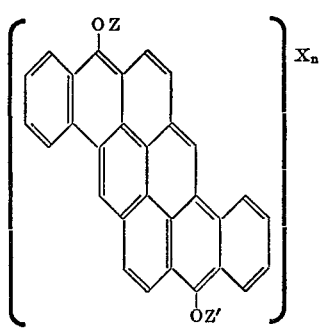

In addition to the —OZ and —OZ' solubilizing groups and the auxochromic groups (designated as X groups), the above classes of dye compounds may also be substituted with various other groups (e.g. fluorine, nitrile, hydroxy, alkyl, aryl, polycyclic, acyl, alkoxy) which are stable and do not cause decomposition of the chromophore portion of the dye compound.

With respect to the preferred classes of dye compounds described above, X preferably represents a heavy halogen atom (e.g. Cl or Br), and preferably $n$ is an integer of at least two. The X groups can be attached either to the linking moieties or to the moieties comprising the kata condensed aromatic rings.

The dye compounds used in this invention can be prepared by independent synthesis but they are more conveniently prepared from precursor vat dyes containing the anthraquinoid moiety, i.e.

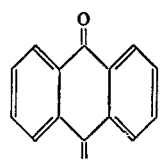

by first reducing the vat dye in the presence of a strong base. For example, Vat Violet 1 (Color Index No. 60010) may be reduced according to the following scheme to produce the dianion.

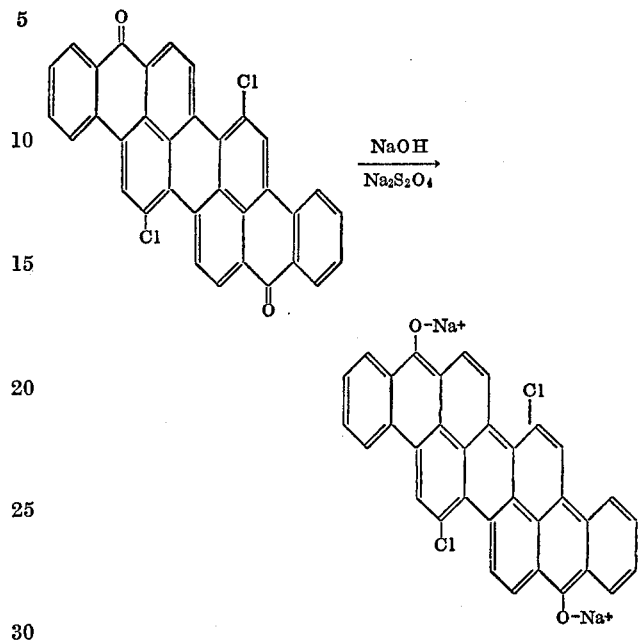

The dianion can then be alkylated with conventional alkylating agents, e.g.

where RX represents agents such as alkyl iodide, alkyl toluene sulfonate or dialkyl sulfate.

To obtain compounds having R groups which are allyl, substituted allyl, propargyl, or substituted propargyl, alkylating agents such as allyl bromide and propargly bromide may be used in the above reaction scheme.

To obtain compounds wherein R and R' represent cycloalkyl radicals the dianion may be reacted with activated cycloalkyl halides, such as 2-chlorocyclohexanone, using the above reaction scheme. The resulting product has the following formula:

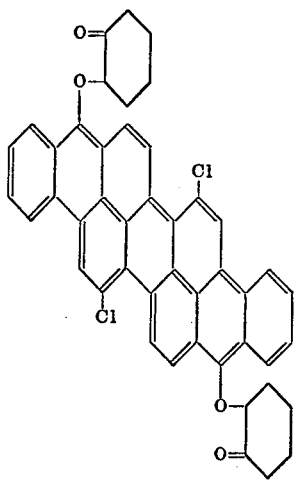

This product may be subsequently reduced via a Wolff-Kischner type reaction to yield a compound of the following formula:

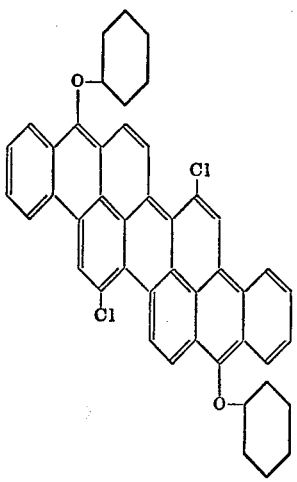

To form an acyl derivative the vat dye is first reduced in the presence of zinc metal and an acid (e.g. acetic acid) followed by reaction of the reduced compound with an anhydride (e.g. acetic anhydride). With Vat Violet 1 as the starting compound one obtains the following dye:

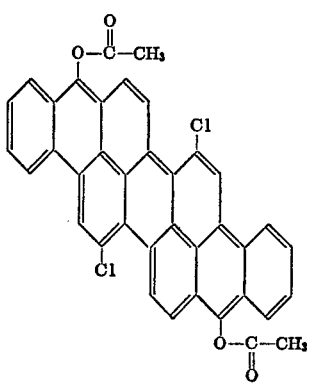

where R and R' represent stable monovalent organic radicals as described earlier herein.

An example of a reaction scheme which may be used to obtain dyes wherein R and R' represent substituted alkyl radicals is as follows. The vat dye is first reduced and acidified to obtain the —OH derivative of the vat dye. Then the following reaction is used,

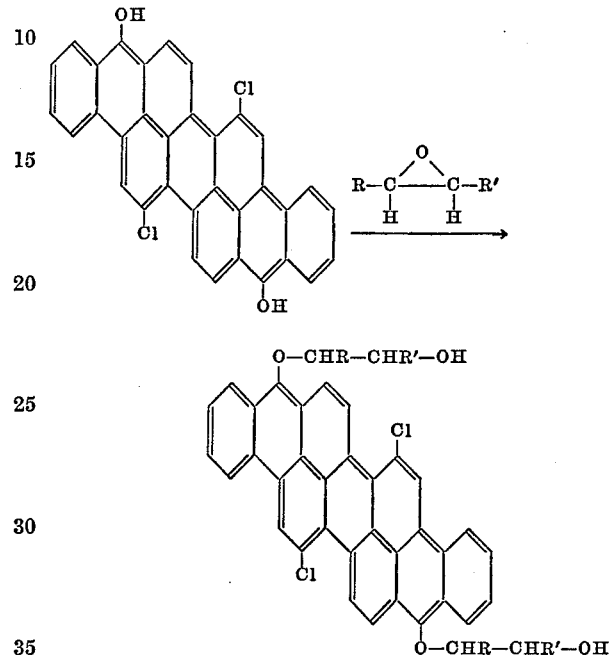

according to the description in U.S. Pat. 2,183,626.

An example of a reaction scheme which may be used to obtain dyes wherein R and R' represent substituted phenyl radicals is as follows. Vat Violet 1 is first reduced in tetrahydrofuran using potassium to obtain the dipotassium derivative as shown

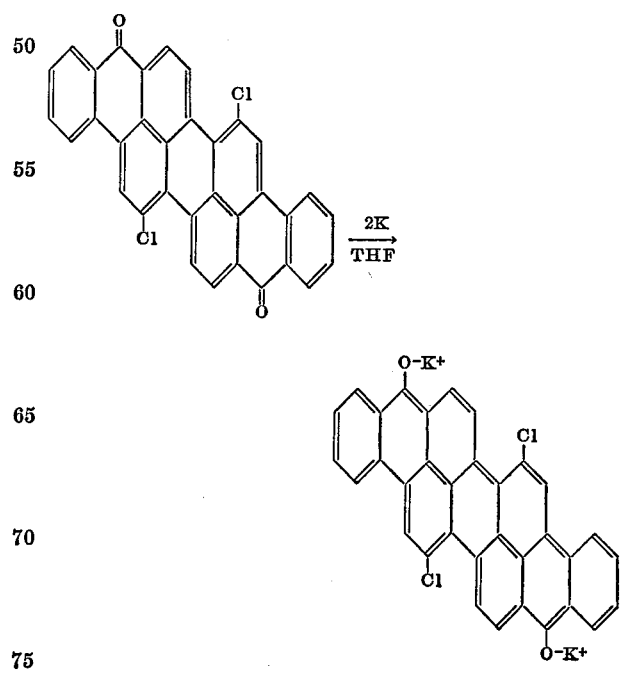

The tetrahydrofuran is removed by distillation and the material is allowed to react with iodobenzene and activated copper at an elevated temperature.

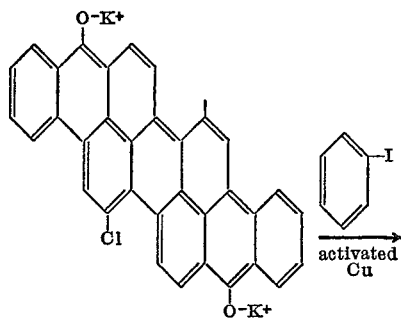

The resulting product is the diphenoxy derivative of Vat Violet 1.

The above reaction scheme is also useful for obtaining dye compounds wherein R and R' represent polycyclic radicals. For example, when 1-iodonaphthalene is reacted with the dipotassium derivative, a dye is obtained having the following formula:

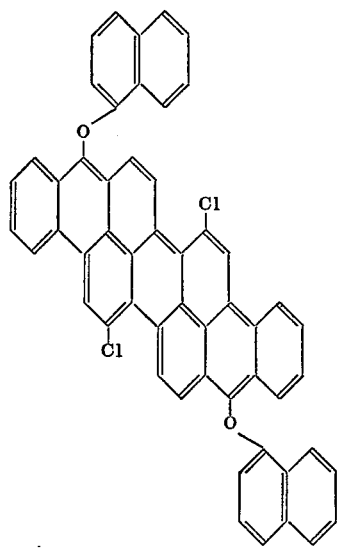

The auxochromic groups are generally put onto the chromophore portion of the vat dye before reduction and substitution of the vat dye, but this is not a necessary condition. To substitute chlorine atom auxochromic groups on a vat dye starting compound the following reaction is quite useful.

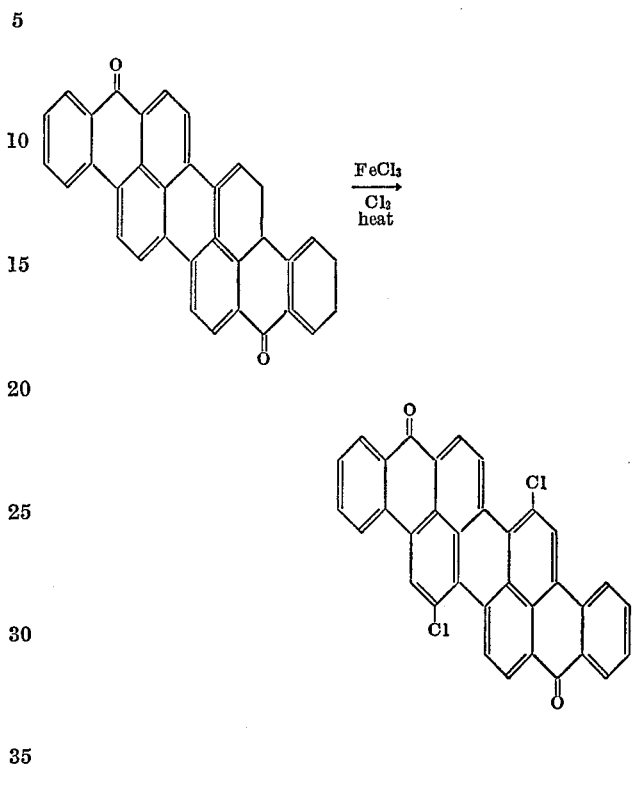

Other dye compounds within the scope of this invention can also be prepared according to the above reaction schemes. Exemplary halogenated vat dyes which are quite useful as starting materials for the preferred classes of dye compounds used in this invention include Vat Blue 18 (Color Index 59815), Vat Blue 22 (Color Index 59820), Vat Orange 1 (Color Index 59105), Vat Orange 2 (Color Index 59705), Vat Orange 3 (Color Index 59300) and Vat Violet 1 (Color Index 60010).

The imaging sheets of this invention preferably comprise a film-forming binder, acceptor and sensitizer dye in the form of a thin face-coating on a thin-light-transmissive film material backing. The face-coating is typically very thin, e.g., from less than 0.1 mil to about 0.5 mil.

Although the amount of sensitizing dye used in the imaging sheets of this invention may be varied for economic reasons and so that the light may readily penetrate the dyed coating, although sufficient dye should be used to provide a usefully rapid rate of desnsitization of the acceptor under irradiation with visible light from commercially available sources. The amount of sensitizer dye normally used is in the range of about 0.05 to 2 weight percent based on the total weight of the face-coating. For intermediate imaging sheets the amount of sensitizer dye is preferably in the range of about 0.2 to 0.6 weight percent based on the total weight of the face-coating. Mixtures of these polycyclic dyes can be used in the imaging sheets with similar effectiveness. Mixtures of polycyclic dyes with other known oxygen-sensitizing dyes can also be used in these imaging sheets, if desired.

The amount of acceptor which may be used in the imaging sheets of this invention may vary over wide ranges depending upon the molecular weight and solubility of the particular acceptor used. Normally the amount of acceptor present in the imaging sheet is in the range of about 1 to 8 weight percent based on the total weight of the face-coating, although more or lesser amounts of acceptor may also be used if desired.

Film-forming binders which can be used in this invention include those known in the art, which ethoxylated cellulose derivatives such as "Ethocel" (N-grade) or "Ethocel" (T-grade), commercially available from Hercules, being the preferred film-forming binders.

When using the ethoxylated cellulose derivatives as film-forming binders in making imaging sheets in accordance with this invention, it is preferred to use acetone, methyl ethyl ketone, methanol or ethanol, or combinations thereof, as the major constituents of the solvent system from which the binder, acceptor and dye are coated. Minor amounts (i.e., less than about 10 weight percent) of other solvents may be included in the solvent system for various reasons, such as pre-solubilizing the dyes or improving the surface characteristics of the final coating. Such other solvents which may be included in minor amounts include chloroform, n-butanol, toluene, and heptane.

The intermediate imaging sheets of this invention can be used with many and various receptor sheets to produce finished copies of originals, so long as the photosensitive acceptor in the intermediate sheet forms a visibly distinct reaction product with a co-reactant present in the receptor sheet. For example, when the photosensitive acceptor is an alpha-naphthol or a substituted hydrazone, suitable co-reactants which are normally used in the receptor sheet are silver soaps of long-chain fatty acids, e.g., silver behenate and silver stearate. These soaps are visibly stable toward light, are insoluble in many volatile liquid vehicles, and are moisture resistant, and these materials either alone or blended with additional fatty acid are very useful for use in conjunction with the imaging sheets employing alpha-naphthol acceptors, although many other readily reducible normally solid organic acid salts of noble metals are also useful. Receptor or imaging sheets employing such co-reactants are described in detail in U.S. Pat. 3,218,166 (Reitter), incorporated herein by reference. Other useful receptor sheets are described in U.S. Pat. 3,094,417 (Workman). When substituted dithiooxamids are used as photosensitive acceptors, the most commonly used co-reactant is nickel stearate, although other nickel salts can also be used, e.g., nickel acetate.

Pigments such as zinc oxide, fillers such as powdered silica, resins such as powdered high-melting terpene resin, toning agent such as phthalazinone, and various other modifiers and additives may be included in the receptor sheet if desired.

When making unitary heat-sensitive imaging sheets in accordance with this invention two chemically inter-reactive components (an acceptor and a co-reactant) and a sensitizing polycyclic dye are contained in the sheet in such manner that the two chemically inter-reactive components are physically distinct and are in chemically inter-active relationship for rapidly inter-reacting at a conversion temperature between about 90° C. and 150° C. to produce a visibly distinct reaction product. One of the reactive components is readily desensitizable against said inter-reaction upon exposure to excited oxygen. Thus, when the imaging sheet is exposed image-wise to visible light (400 to 700 nanometer wavelength range) the sensitizing dye excites or sensitizes molecular oxygen which in turn densitizes one of said chemically reactive components in an image-wise manner. When the exposed imaging sheet is thereafter heated to 90° C. to 150° C. the remaining chemically interreactive components inter-react to form a visibly distinct reaction product.

Suitable reactive components which are desensitized by excited molecular oxygen include those acceptors described earlier in this application in the classes of alpha-naphthols, hydrazones, substituted hydrazones and dithiooxamides. Other suitable desensitizable acceptors which can be used are those known in the art.

Suitable co-reactants which can be used in the unitary imaging sheet include those normally solid organic acid salts of noble metals, e.g., silver behenate and silver stearate. Other suitable co-reactants for the acceptors described are well known in the art, e.g., nickel stearate.

Normally the unitary imaging sheet comprises at least two separate coating layers on a thin, flexible film or paper backing. The bottom layer normally comprises a film-forming binder (e.g., acrylate resins or polyvinyl butyral) and a co-reactant for the photosensitive acceptor. The top or upper layer normally comprises a film-forming binder (e.g., ethyl cellulose), a photosensitive acceptor and an oxygen-sensitizing polycyclic aromatic dye of the type described earlier in this application. The upper layer is coated onto the bottom layer using a solvent or solvent mixture which is a non-solvent for the binder of the bottom layer so that inter-reaction of the acceptor and co-reactant is avoided.

When preparing unitary imaging sheets having longer shelf-life it is preferred to use a three layer construction in which the bottom layer is as described above, the middle layer is a barrier layer, and the top layer is as described above. The barrier layer impedes diffusion of the acceptor to the co-reactant in the bottom layer and also prevents interface reaction between the top and bottom layers. A suitable barrier layer comprises a vinyl resin coated from a solvent which is a non-solvent for the binder of the bottom layer.

It will be apparent to those skilled in the art that unitary imaging sheets of the type described may be prepared, without departing from the scope of this invention, by means other than separate coating layers for the acceptor and coreactant, e.g., by dispersing elevated temperature-reactive particulate co-reactant throughout the acceptor layer or by dispersing insoluble particulate co-reactant throughout the acceptor layer.

The following examples illustrate the preparation of polycyclic aromatic dyes useful in this invention.

EXAMPLE 1

A polycyclic aromatic dye compound is prepared using as a starting material Vat Blue 18 (Color Index 59815).

Into a 6 liter Erlenmeyer Pyrex reaction flask fitted with stirrer and nitrogen purge are added the following ingredients, with stirring, in the order and amounts shown, in a well ventilated hood:

Isopropanol _____ml__ 1500
Powdered Vat Blue 18 _____grams__ 50
Alkaline hydrosulfite solution (200 grams NaOH and 100 grams $Na_2S_2O_4$ dissolved in 1500 ml. distilled water).

Stirring is continued for 30 minutes at ambient temperature. Then 200 grams of diethyl sulfate are added and stirring is continued for two hours at ambient temperature; after which another 200 grams of diethyl sulfate are added and stirring is continued for another two hours whereby the product dye is formed. Then 2000 ml. of distilled water (heated to 70° C.) is added to the reaction flask with stirring, followed by the addition of 200 ml. of concentrated ammonium hydroxide. Stirring is continued for another 30 minutes.

The reaction mixture is then filtered through a coarse grade Wattman filter in a 38 cm. Büchner funnel with aspirator suction. The product dye cake is then washed with distilled water. The product dye cake is not allowed to become dry or cracked at any time. The product dye cake is then washed with ethanol in the funnel until the color of the ethanol wash becomes pinkish. The product dye is then collected and dried with a yield of approximately 80%.

The product dye of the formula

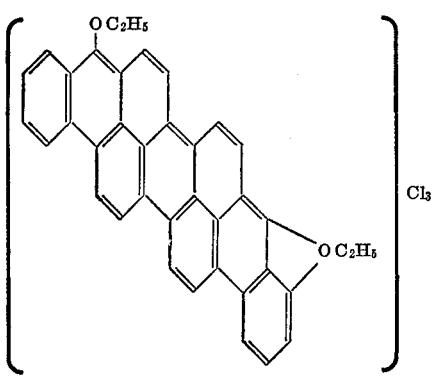

EXAMPLE 2

A polycyclic dye compound is prepared using as a starting vat dye material 50 grams of Vat Orange 2 (Color Index 59705) according to the procedure of Example 1. The product dye cake is washed with water and ethanol according to procedure of Example 1 until the ethanol wash becomes yellow in color. The product dye has the formula

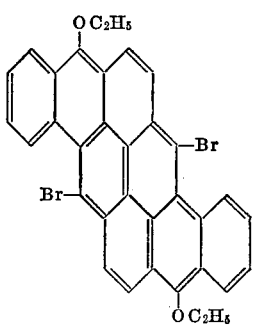

EXAMPLE 3

A polycyclic dye compound is prepared according to the procedure of Example 1 using as a starting material 50 grams of Vat Violet 1 (Color Index 60010). The product dye cake is washed with water and ethanol according to the procedure of Example 1 until the ethanol wash became pinkish in color. The product dye has the formula

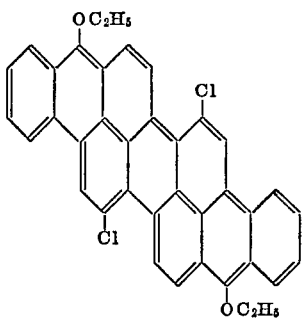

EXAMPLE 4

A polycyclic dye compound is prepared according to the procedure of Example 1 using as a starting material 50 grams of Vat Orange 3 (Color Index 59300). The product dye cake is washed with water and ethanol according to the procedure of Example 1 until the ethanol wash becomes yellow in color. The product dye is of the formula

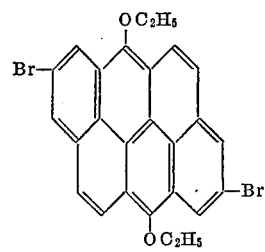

EXAMPLE 5

A polycyclic dye compound is prepared according to the procedure of Example 1 using as a starting material 50 grams of Vat Orange 1 (Color Index 59105). The product dye cake is washed with water and ethanol according to the procedure of Example 1 until the ethanol wash becomes yellow in color. The product dye is of the formula

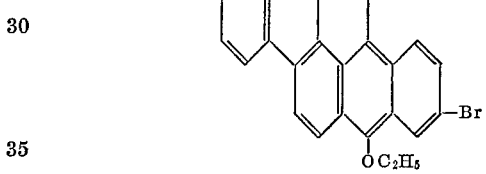

The following non-limiting example further illustrates the present invention, wherein the term "parts" refers to parts by weight unless otherwise indicated.

EXAMPLE 6

An intermediate film member is provided by coating a thin (1 mil) transparent "Mylar" polyester film with a coating solution of film-forming binder, acceptor, and sensitizing dye. The coating solution is prepared by dissolving 0.02 part of a sensitizing dye of the formula

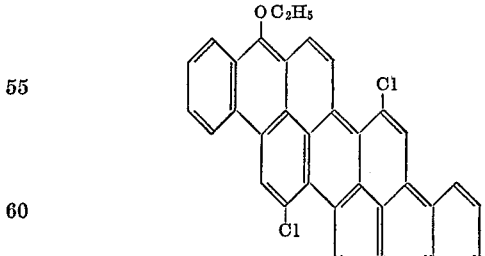

into 2.0 parts of chloroform which is then added to a solution of 8 parts n-butanol in 87 parts acetone. Five parts of ethoxylated cellulose (Ethocel N–100) is then dissolved into the solution containing the dye, after which 0.2 part of 4-methoxy-1-naphthol (acceptor) is added. The resulting solution is coated (1 mil orifice) onto the polyester film in darkness and is allowed to dry at room temperature for 15 minutes. A pink light-transmissive sensitized intermediate film member results.

The intermediate film member is first placed with its coated surface in contact with a multi-colored original having light absorptive inked image areas on a reflective white paper background and which is then uniformly exposed through the film to intense illumination from a bank of tungsten filament lamps for a time just sufficient to desensitize the coating completely at the background areas. A typical exposure time may be 12–15 seconds.

The exposed intermediate film member is then placed with its coated surface in contact with the coated surface of an image or a receptor sheet prepared in accordance with U.S. Pat. 3,218,166 (Example 1) and the composite is heated, for example, between rolls or platens, for 4–5 seconds at 125–140° C. A copy of the graphic original is produced on the coated sheet. The image areas are a dense black, while the background areas remain visibly unchanged.

EXAMPLE 7

An intermediate film member is prepared in accordance with the procedure and ingredients of Example 6 except that the sensitizing dye (0.02 part) used was of the formula

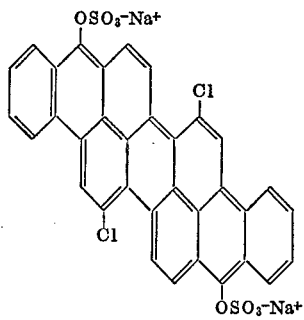

which was initially dissolved in methanol (2 parts) rather than in chloroform. This sensitizer dye (color index 60011) is commercially available under the trade name designation "Algosol Brilliant Violet 14R" from General Aniline and Film Corp.

A copy of a graphic original was prepared in accordance with the procedure of Example 6 using the intermediate film member of this example. The resulting copy had image areas being dense black with background areas being visibly unchanged.

EXAMPLE 8

An intermediate film member is prepared in accordance with the procedure of Example 6 except that the sensitizing dye used is of the formula

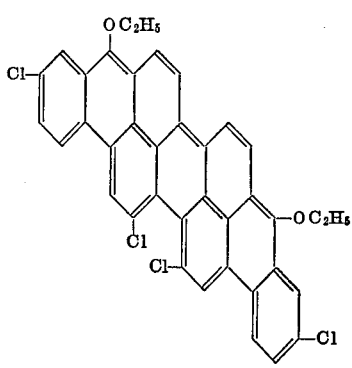

and the acceptor used is vanillin phenylhydrazone.

A copy of a graphic original is prepared in accordance with the procedure of Example 6 using the intermediate film member of this example. The resulting copy has image areas being dense black with background areas being visibly unchanged.

EXAMPLE 9

An intermediate film member is prepared in accordance with the procedure of Example 6 except that the sensitizing dye used is of the formula

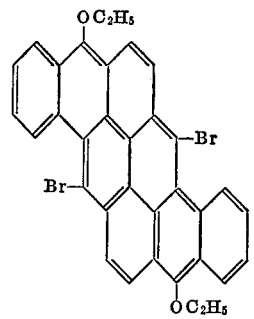

and the acceptor used is furaldehyde phenylhydrazone.

A copy of a graphic original is prepared in accordance with Example 6 using the intermediate film member of this example. The resulting copy has image areas being dense black with background areas being visibly unchanged.

EXAMPLE 10

An imaging sheet is prepared in accordance with the procedure of Example 6 except that he sensitizing dye used is of the formula

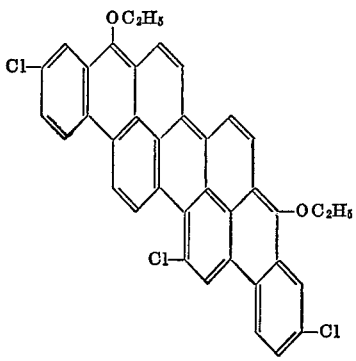

and the acceptor used is 2-(1-naphthyl)-5-phenyloxazole, a strongly fluorescing compound with its major absorption in the ultraviolet wavelength range but with its major fluorescence in the visible range.

The imaging sheet is placed with its coated surface in contact with a multi-colored original having light-absorptive inked image areas on a reflective white paper background and which is then uniformly exposed through the film to intense illumination from a bank of tungsten filament lamps for a time just sufficient to desensitize the coating completely at the background areas. A typical exposure time may be 12–15 seconds.

The exposed imaging sheet is then exposed to black (ultraviolet) light whereby a negative fluorescent image is observed on the imaging sheet due to the fluorescence of the 2-(1-naphthyl)-5-phenyl-oxazole in the image area. The ultraviolet photons therefore functions as a co-reactant with the 2-(1-naphthyl)-5-phenyloxazole in the imaging sheet.

EXAMPLE 11

An intermediate film member is provided by coating a thin (1 mil) "Mylar" polyester film with a coating solution of film forming binder, acceptor, and sensitizing dye. The coating solution is prepared by dissolving 0.02 part of a sensitizing dye of the formula

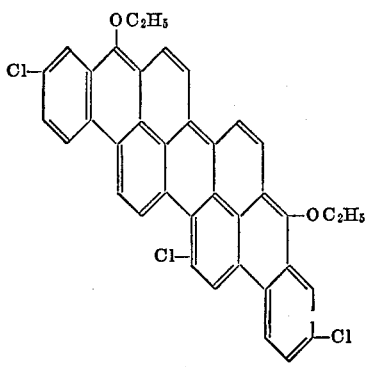

into 2.0 parts of chloroform which is then added to a solution of 8 parts n-butanol is 87 parts acetone. Five parts of ethoxylated cellulose (Ethocel N-100) is then dissolved into the solution of the dye, after which 0.2 part of difurfuryldithiooxamide is added. The resulting solution is coated (1 mil orifice) onto the polyester film in darkness and is allowed to dry at room temperature for 15 minutes. A pinkish light-transmissive sensitized intermediate film member results.

The intermediate film member is first placed with its coated surface in contact with a multi-colored original having light-absorptive inked image areas on a reflective white paper background which is then uniformly exposed through the film to intense illumination from a bank of tungsten filament lamps for a time just sufficient to desensitize the coating completely in the background areas. A typical exposure time may be 12–15 seconds.

The exposed intermediate film member is then placed with its coated surface in contact with the coated surface of a receptor sheet prepared by ball milling and then knife-coating on bond paper a mixture of 3 parts nickel stearate, 2 parts silica powder, 4 parts polyvinyl acetate resin and 46 parts methyl ethyl ketone. The composite is heated, for example, between rolls or platens, for 4–5 seconds at 125–140° C.

A copy of the graphic original is produced on the coated sheet. The image areas are purple, while the background areas remain visibly unchanged.

A unitary heat-sensitive imaging sheet is prepared in accordance with the following example.

EXAMPLE 12

Methyl ethyl ketone (88 parts), tetrachlorophthalic anhydride (0.24 part), stannous stearate (0.0072 part), and silver behenate (12 parts) are homogenized twice at 8000 p.s.i. To this mixture is added a solution of methyl ethyl ketone (68 parts), "Lucite 2042" acrylate resin (6 parts), "PLFS 130" cellulose ester resin (6 parts), phthalazinone (1.8 parts), butylated, hydroxy toluene (1.44 parts) and "Ethyl Corp. 702" antioxidant (0.10 part). The mixture is knife coated on 2 mil "Mylar" polyester backing at a 3 mil wet thickness and allowed to dry for 15 min.

To a solution of acetone (20.4 parts) and tetrahydrofuran (1.2 parts) is added, with mixing, 2.4 parts of VYNS-3 vinyl resin and the vinyl resin is allowed to dissolve. The solution then is knife coated on top of the previous coating at a wet thickness of 2 mils and allowed to dry for another 15 min.

A third solution is prepared in the following manner. To 91 parts ethanol, with stirring, are added 0.02 part of

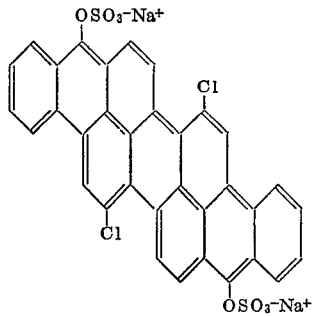

and the sensitizer dye is allowed to dissolve. Subsequently, 4 parts n-butanol and 5 parts of "Ethocel N-300" ethoxylated cellulose resin are added to the solution. The resin is then allowed to dissolve by further mixing. Shortly prior to coating, 4-methoxy-1-naphthol (0.12 part) is added and allowed to dissolve in subdued light. Still in subdued light the above solution is knife coated on top of the previous two coatings at a wet thickness of 2 mils and allowed to dry in subdued light for 15 min.

The resulting product is a pinkish, transparent, light-densitizable and heat-sensitive imaging sheet capable of forming excellent transparencies when used in the following manner. The imaging sheet is placed with its coated surface in contact with a printed original having light-absorptive inked image areas on a reflective white paper background and which is then uniformly exposed through the film, i.e., in the reflex position to intense illumination from a bank of tungsten filament lamps for a time just sufficient to desensitize the coating completely at the background areas. A typical exposure time may be 12–15 sec. During such exposure the image areas in the imaging sheet are also partially desensitized by the light but to a lesser extent than in non-image areas due to absorption by the image areas of the graphic original of that portion of the actinic radiation not previously absorbed in the sensitive coating of the imaging sheet.

The exposed imaging sheet is next heated for 4–5 sec. at 125–140° C., for example, between rolls of platens. A copy of the graphic original is produced on the coated sheet. The image areas are a dense black; the background remains visibly unchanged and transparent. The copy can thus be used with an overhead projector to give excellent projections.

What is claimed is:

1. An imaging sheet having a light-sensitive layer including a film-forming binder, a reactant which is reactive with a co-reactant to provide a visible change and is rendered non-reactive with said co-reactant upon desensitization with excited oxygen, and an effective amount, within the approximate range of about 0.05 to 2 weight percent based on the total weight of said layer, of an oxygen-sensitizing polycyclic aromatic dye, said dye comprising at least two moieties in conjugate relationship as part of a single chromophore, each said moiety comprising three linearly kata condensed six-membered aromatic rings, an —OZ group being attached to the meso position of each said moiety, wherein Z is a stable, monovalent radical, said OZ group being a solubilizing group for said compound, wherein at least one auxochromic group comprising an atom having an atomic weight of at least 31 is bonded to said chromophore by means of said atom; wherein said dye compound exhibits visible fluorescence when a 0.001 molar solution thereof is exposed to ultraviolet light in the 200 to 400 nanometer wavelength range; wherein said reactant is desensitized in an image-wise manner upon exposure of the imaging sheet to a visible light image pattern.

2. An imaging sheet in accordance with claim 1 wherein said film-forming binder, said reactant and said dye are in the form of a thin face-coating on a light-transmissive film material backing.

3. An imaging sheet in accordance with claim 2 wherein said backing comprises a thin, transparent, flexible film.

4. An imaging sheet in accordance with claim 1 wherein said reactant comprises an alpha-naphthol.

5. An imaging sheet in accordance with claim 4 wherein said alpha-naphthol is 4-methoxy-1-naphthol.

6. An imaging sheet in accordance with claim 1 wherein said polycyclic aromatic dye is of the formula

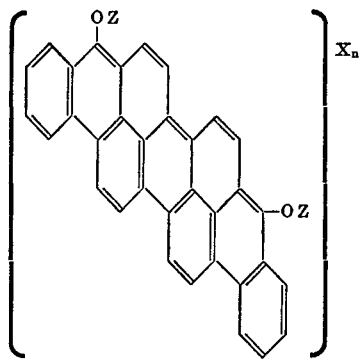

wherein Z is selected from the group consisting of lower alkyl, acyl, and —$SO_3Y$ radicals, where Y is selected from the group consisting of alkali metal, alkaline earth metal, and ammonium ions; and wherein X is selected from the group consisting of chlorine and bromine atoms, and $n$ is 2–4.

7. An imaging sheet in accordance with claim 6 wherein Z is lower alkyl and X is chlorine.

8. An imaging sheet in accordance with claim 6 wherein said reactant is an alpha-naphthol.

9. An imaging sheet in accordance with claim 1 wherein said polycyclic aromatic dye is of the formula

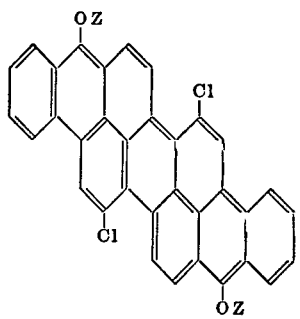

wherein Z is selected from the group consisting of lower alkyl, acyl and —$SO_3Y$ radicals, where Y is selected from the group consisting of alkali metal, alkaline earth metal and ammonium ions.

10. An imaging sheet in accordance with claim 9 wherein Z is lower alkyl.

11. An imaging sheet in accordance with claim 9 wherein said reactant is an alpha-naphthol.

12. An imaging sheet in accordance with claim 11 wherein said reactant is 4-methoxy-1-naphthol.

13. A unitary heat-sensitive imaging sheet capable of undergoing permanent visible change on being momentarily heated to a conversion temperature between about 90° C. and about 150° C. and comprising a thin backing and a visibly heat-sensitive layer comprising a film-forming binder, at least two chemically inter-reactant components in physically distinct and chemically inter-reactive relationship for rapidly inter-reacting at said conversion temperature to produce a visibly distinct reaction product and of which one of said components is capable of being readily desensitized in the present of excited molecular oxygen, and a polycyclic, aromatic, oxygen-sensitizing dye comprising at least two moieties in conjugate relationship as part of a single chromophore, each said moiety comprising three linearly kata condensed six-membered aromatic rings, an —OZ group being attached to the meso position of each said moiety, wherein Z is a stable, monovalent radical, said —OZ group being a solubilizing group for said compound, wherein at least one auxochromic group comprising an atom having an atomic weight of at least 31 is bonded to said chromophore by means of said atom; wherein said dye compound exhibits visible fluorescence when a 0.001 molar solution thereof is exposed to ultraviolet light in the 200 to 400 nanometer wavelength range.

14. An imaging sheet in accordance with claim 13 wherein said component capable of being readily desensitized in the presence of excited molecular oxygen is an alpha-naphthol.

15. An imaging sheet in accordance with claim 13 wherein said polycyclic aromatic dye is of the formula

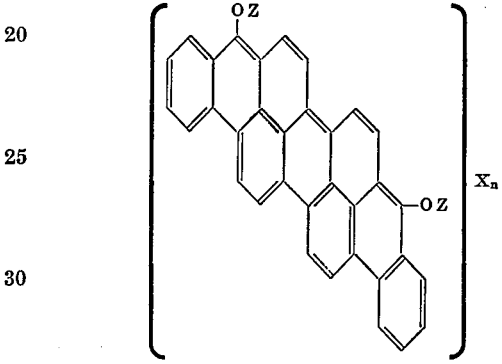

wherein Z is selected from the group consisting of lower alkyl, acyl and —$SO_3Y$ radicals, where Y is selected from the group consisting of alkali metal, alkaline earth metal and ammonium ions; and wherein X is selected from the group consisting of chlorine and bromine atoms, and $n$ is 2–4.

16. An imaging sheet in accordance with claim 15 wherein Z is lower alkyl and X is chlorine.

17. An imaging sheet in accordance with claim 15 wherein said reactant is 4-methoxy-1-naphthol.

18. An imging sheet in accordance with claim 13 wherein said polycyclic aromatic dye is of the formula

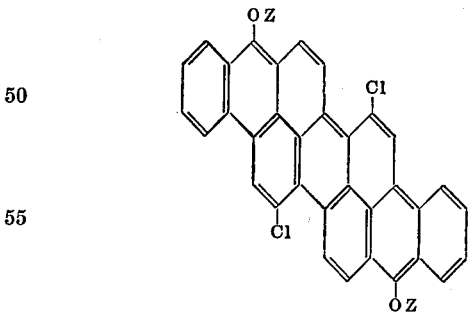

wherein Z is selected from the group consisting of lower alkyl, acyl and —$SO_3Y$ radicals, where Y is selected from the group consisting of alkali metal, alkaline earth metal and ammonium ions.

19. An imaging sheet in accordance with claim 18 wherein Z is lower alkyl.

20. An imaging sheet in accordance with claim 18 wherein said reactant is 4-methoxy-1-naphthol.

21. An imaging sheet in accordance with claim 18 wherein one of said components is an alpha-naphthol and the other of said components is silver behenate.

22. An imaging sheet in accordance with claim 15 wherein one of said components is an alpha-naphthol and the other of said components is silver behenate.

23. In the process for the image-wise densensitization of a light-sensitive imaging sheet comprising a film-forming binder, a dye, and a reactant which is reactive with a coreactant to provide a visible change and is rendered nonreactive with said co-reactant upon desensitization with excited oxygen, the improvement comprising said dye being an oxygen-sensitizing polycyclic aromatic dye compound comprising at least two moieties in conjugate relationship as part of a single chromophore, each said moiety comprising three linearly kata condensed six-membered aromatic rings, an —OZ group being attached to the meso position of each said moiety, wherein Z is a stable, monovalent radical, said OZ group being a solubilizing group for said compound, wherein at least one auxochromic group comprising an atom having an atomic weight of at least 31 is bonded to said chromophore by means of said atom; wherein said dye compound exhibits visible fluorescence when a 0.001 molar solution thereof is exposed to ultraviolet light in the 200 to 400 nanometer wavelength range.

24. The process of claim 23, wherein said dye is of the formula

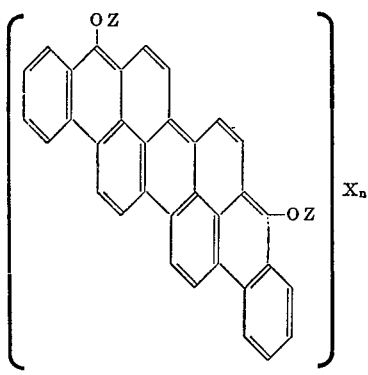

wherein Z is selected from the group consisting of lower alkyl, acyl, and —SO₃Y radicals, where Y is selected from the group consisting of alkali metal, alkaline earth metal and ammonium ions; and wherein X is selected from the group consisting of chlorine and bromine atoms, and $n$ is 2-4.

25. The process of claim 24 wherein Z is lower alkyl and X is chlorine.

26. The process of claim 24 wherein said reactant is an alpha-naphthol.

27. The process of claim 23 wherein said dye is of the formula

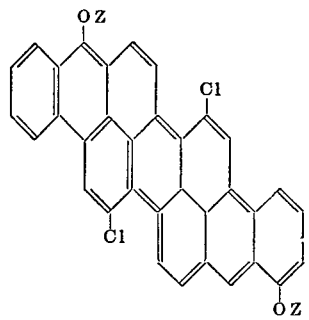

wherein Z is selected from the group consisting of lower alkyl, acyl and —SO₃Y radicals, where Y is selected from the group consisting of alkali metal, alkaline earth metal and ammonium ions.

28. The process of claim 27 wherein Z is lower alkyl.

29. The process of claim 27 wherein said reactant is an alpha-naphthol.

References Cited
UNITED STATES PATENTS

| | | | |
|---|---|---|---|
| 3,526,506 | 9/1970 | Workman | 96—114.1 |
| 3,447,944 | 6/1969 | Werner | 117—36.8 |
| 3,218,166 | 11/1965 | Reitter | 96—67 |
| 3,094,417 | 6/1963 | Workman | 96—114.1 |

NORMAN G. TORCHIN, Primary Examiner

E. C. KIMLIN, Assistant Examiner

U.S. Cl. X.R.

96—88, 114.1; 117—36.8

UNITED STATES PATENT OFFICE
CERTIFICATE OF CORRECTION

PATENT NO. : 3,799,779
DATED : March 26, 1974
INVENTOR(S) : MALCOLM B. BURLEIGH

It is certified that error appears in the above-identified patent and that said Letters Patent are hereby corrected as shown below Col. 5, 2nd structure across should read --

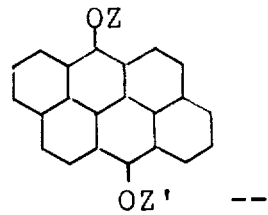

--

Col. 7, 2nd structure down should read --

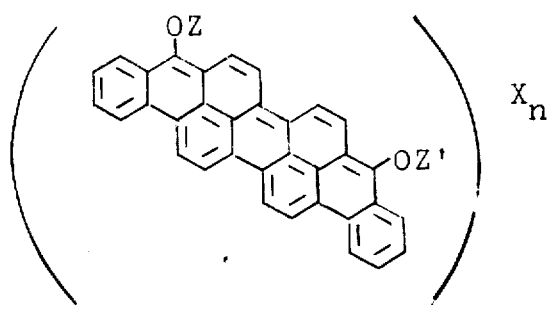

Col. 13, line 40, change "dithiooxamids" to -- dithiooxamides -- .

Col. 22, Claim 18, change "imging" to -- imaging -- .

Signed and Sealed this twenty-fifth Day of November 1975

[SEAL]

Attest:

RUTH C. MASON
Attesting Officer

C. MARSHALL DANN
Commissioner of Patents and Trademarks